United States Patent
Dortschy et al.

(10) Patent No.: US 8,295,151 B2
(45) Date of Patent: Oct. 23, 2012

(54) METHOD CENTRAL UNIT, AND MODEM IN A DIGITAL SUBSCRIBER LINE NETWORK

(75) Inventors: Boris Dortschy, Hägersten (SE); Jaume Rius i Riu, Vällingby (SE); Rodrigo Bastos Moraes, Rio de Janeiro (BR); Aldebaro Klautau, Belém (BR); Ronaldo Zampolo, Belém (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 668 days.

(21) Appl. No.: 12/531,558

(22) PCT Filed: Mar. 23, 2007

(86) PCT No.: PCT/SE2007/050179
§ 371 (c)(1),
(2), (4) Date: Sep. 16, 2009

(87) PCT Pub. No.: WO2008/118048
PCT Pub. Date: Oct. 2, 2008

(65) Prior Publication Data
US 2010/0103993 A1    Apr. 29, 2010

(51) Int. Cl.
*H04J 3/10* (2006.01)
*H04L 12/28* (2006.01)
(52) U.S. Cl. ........................... 370/201; 370/420
(58) Field of Classification Search .............. 370/201, 370/254, 255, 420, 485
See application file for complete search history.

(56) References Cited

U.S. PATENT DOCUMENTS

| | | | |
|---|---|---|---|
| 7,106,833 B2 * | 9/2006 | Kerpez | 379/1.03 |
| 7,394,752 B2 * | 7/2008 | Hasegawa et al. | 370/201 |
| 7,813,293 B2 * | 10/2010 | Papandriopoulos et al. | 370/252 |
| 7,826,338 B2 * | 11/2010 | Zhou | 370/201 |
| 2003/0086362 A1 * | 5/2003 | Hasegawa et al. | 370/201 |

(Continued)

FOREIGN PATENT DOCUMENTS

EP    1 670 202 A1    6/2006
(Continued)

OTHER PUBLICATIONS

Tsiaflakis, P. et al. An Efficient Search Algorithm for Lagrange Multipliers of Optimal Spectrum Balancing in Multi-User XDSL Systems. ICASSP 2006 Proceedings. 2006 IEEE International Conference on Acoustics, Speech and Signal Processing. May 14-19, 2006.

(Continued)

*Primary Examiner* — Hong Cho

(57) ABSTRACT

A method, central unit, and modem for reducing crosstalk in a Digital Subscriber Line (DSL) system. A virtual line referred to as a ghost line is introduced in the system as a substitution for all of the lines except a first line to induce crosstalk to the first line. The Power Spectral Density (PSD) on the first line is allocated to optimize against the ghost line. A modem on the first line reports to a central Spectrum Management Center (SMC), a measure indicating crosstalk impact from the ghost line. This process is repeated for each line. The SMC calculates updated ghost line parameters for each line, which reflect current crosstalk characteristics between each modem and the remaining modems, and sends the updated parameters to the modems. The modems then reallocate PSDs with respect to the updated ghost line parameters to either maximize the rate or minimize the power on their respective lines.

20 Claims, 7 Drawing Sheets

U.S. PATENT DOCUMENTS

2009/0059780 A1 * 3/2009 De Lind Van Wijngaarden et al. ............................ 370/201

FOREIGN PATENT DOCUMENTS

| JP | 2003-264484 A | 9/2003 |
|---|---|---|
| JP | 2007-067527 A | 3/2007 |
| WO | WO 98/06186 A1 | 2/1998 |

OTHER PUBLICATIONS

Cendrillon, R. et al. Iterative Spectrum Balancing for Digital Subscriber Lines. ICC 2005. IEEE International Conference on Communications. Seoul, Korea. May 16-20, 2005.

* cited by examiner

METHOD CENTRAL UNIT, AND MODEM IN A DIGITAL SUBSCRIBER LINE NETWORK

TECHNICAL FIELD

The present invention relates to methods and arrangements in a Digital Subscriber Line (DSL) network. In particular, the invention concerns methods and arrangements for minimizing the deleterious effect of crosstalk in a DSL network.

BACKGROUND

Digital Subscriber Lines are the most important means for delivering high-speed Internet access. Crosstalk has been identified as one of the main sources of performance degradation in DSL networks. Crosstalk is the effect of electromagnetic coupling of different lines transmitting in the same binder—the phenomenon can be interpreted as if the signal of one line leaks into all neighboring lines as illustrated in FIG. 1. Balancing crosstalk is a compensating game: decreasing crosstalk by reducing transmit power and thus increasing system performance goes typically along with decreasing individual line performance. Crosstalk is a major impairment for improvements in rate and reach in the network, thus crosstalk is one of the most important limiting factor for better service provisioning and increase in the number of users served by the technology.

Recently, new strategies for dealing with crosstalk have been created. Crosstalk interference in a given receiver of interest depends basically on two factors: the transmitter Power Spectral Densities (PSDs) of all users different than the user of interest and the coupling function from these transmitters to the receiver of interest. There is no possible way to manipulate crosstalk gains in a binder, but it is feasible to design users' PSDs such that crosstalk is minimized by still maintaining the system's data rates, and maybe even increasing it. Strategies to optimize and custom design the users' PSDs are referred to as Dynamic Spectrum Management (DSM).

There are two main approaches for the DSM problem in the DSL: the Rate Maximization Problem (RMP), often also referred to as Rate Adaptive (RA) problem [Starr, Sorbara, Cioffi, Silverman, "DSL Advances", Prentice Hall] and the Power Minimization Problem (PMP), often also referred to as Fixed Margin (FM) problem [Starr, Sorbara, Cioffi, Silverman, "DSL Advances", Prentice Hall].

Consider an N-user multicarrier system that splits the available spectra in K tones. Let $p_n^k$ be the PSD of user n on tone k. Consider the matrix arrangement $P_{(N \times K)}$ of all $p_n^k$, as follows $$P_{(N \times K)} = \begin{bmatrix} p_1^1 & \cdots & p_1^K \\ \vdots & \ddots & \vdots \\ p_N^1 & \cdots & p_n^k \end{bmatrix} \quad (0)$$

The upper left-corner element will denote the PSD of user 1 in the first tone. The lower right-corner element will denote the PSD of the N-th line in tone K. One row of matrix P, which will be referred to as $P_n$, will represent the PSD distribution of user n across all tones, i.e., $P_n = [p_n^1, p_n^2, \ldots, p_n^{K-1}, p_n^K]$. One column of matrix P, which will be represented as $P^k$, will represent the PSD allocation of all users across one tone, i.e., $P^k = [p_1^k, p_2^k, \ldots p_{N-1}^k, p_N^k]$.

One can formulate the RMP as the task of finding a given matrix P such that the data rate of one given user (say, user 1) is maximized while all other users in the network achieve a minimum desired rate $R_n^{min}$ and a limited power budget for each user is respected. One but not exclusive formulation of the RMP could be $$P = \underset{P}{\operatorname{argmax}} R_1 \quad (1)$$

such that $R_n \geq R_n^{min} \forall n > 1$; $P_n^{tot} \leq P_n^{max} \forall n$
in which the rates $R_n^{min}$ denotes the said minimum rate and $P_n^{max}$ denotes the said maximum power constraints. $P_n^{tot}$ can be determined as sum of the n-th row in equation (0) and $R_n$ can be determined as sum of the rate on each tone of user n in the multicarrier system.

As stated above, the main objective behind the RMP is the optimisation of PSDs under the given set of constraints.

The objective-function of the RMP problem can be re-written as a weighted rate-sum maximization, $$P = \underset{P}{\operatorname{argmax}} \sum w_n R_n \text{ such that } P_n^{tot} \leq P_n^{max} \forall n \quad (2)$$

with a certain set of weights or priorities $w_n$ of user n. By controlling the $w_n$, one controls how much resources (in terms of power) a line can or must use to achieve a maximum objective. In the solution the set of $w_n$ is uniquely determined by the minimum rates constraints and thus no constraints are neglected. Often it is further assumed that $$\sum_n w_n = \text{constant} = C.$$

In practice, the right $w_n$ are not known in advance and are (iteratively) found such that all rate constraints are respected. In this case, these variables can be interpreted as the amount of channel resources needed for each user to achieve (at least) a specific minimum rate. Often the first user should take "the maximum rest", i.e.

$$w_1 = C - \sum_2^N w_n. \quad (2a)$$

The interpretation of the w's is further developed, if set C=1, in which case the w's get a proportional meaning.

The PMP can be formulated as the task of finding a set of PSDs for all users as to minimize total power allocated in the network such that a given set of minimum data-rates is achieved. Hence, the PMP problem can be (non-exclusively) described as $$P = \underset{P}{\operatorname{argmax}} \sum w_n P_n^{tot} \quad (2b)$$

such that $R_n \geq R_n^{min}$; $P_n^{tot} \leq P_n^{max} \forall n$
in which the $w_n$ has the same interpretation of weight or priority as in the case of the RMP (see also Eq. (2)).

Four properties of the different ways to solve the RMP and the PMP are of higher interest, i.e. complexity, centralization, performance and required knowledge. Whereas complexity can simply be described as number of required operations, performance is usually described as a function of the achieved $R_n$. Since the achievable rates are related, it is standard procedure to look for the extending of the rate region: the wider, the better. Centralisation refers to the coordination between the determinations of the PSDs for each user. In a non-centralized schemes (usually called autonomous) the PSDs are determined without any further knowledge of other lines (for example their PSDs or channel information). In contrast, in a full-centralized schemes, the knowledge about all users operations and channels are assumed and exploited. In this case a central management is often assumed to concentrate this knowledge and all operations. Required knowledge is the amount of information necessary or assumed in the different schemes to work. Complexity and performance could be considered as a matter of "taste", centralization and required knowledge are of immediate importance. Channel measurements are time consuming and expensive and centralization is a key question with respect to unbundling of lines and competition between different service providers.

A brief description of existing algorithm follows in chronological order.

The most representative example of a fully autonomous solution to the DSM problem is the Iterative water filling (IWF) method disclosed in W. Yu, G. Ginis, and J. Cioffi, "Distributed multiuser power control for digital subscriber lines," IEEE Journal on Selected Areas of Communications, vol. 20, pp. 1105-1115, 2002. IWF uses the well-known water-filling solution iteratively across the network with each user utilizing the minimum power necessary to achieve a given minimum data-rate. It enjoys low complexity, autonomous implementation and requires no crosstalk channel knowledge, However, it is clearly sub-optimal in near-far scenarios.

OSB (Optimal Spectrum Balancing) demands a fully centralized system in a central agent with complete channel knowledge. Its complexity scales exponentially in the number of user, thus making its use for large networks prohibitive. It assumes convexity of the rate region and use Lagrange variables to decouple the problem across frequency to solve a per-tone maximization to come up with optimal results for the DSM problem. OSB is described in EP 01492261. ISB (Iterative Spectrum Balancing) is the iterative version of OSB. It optimally solves the RMP with smaller computational demands but still requires centralized operation and full channel knowledge.

SCALE disclosed in J. Papandrlopoulos and J. S. Evans, "Low-complexity distributed algorithms for spectrum balancing in multi-user DSL networks," in IEEE International Conference on Communications (ICC), 2006 utilizes a convex approximation of the original non-convex objective function and iterates through it until this approximation is as close as possible to the original formulation.

ASB described in J. Huang, R. Cenchillon, M. Chiang, M. Moonen, "Autonomous Spectrum Balancing (ASB) for Frequency Selective Interference Channels," in IEEE International Symposium Infounation Theory (ISIT), Seattle, 2006 uses the concept of a reference line to represent in each modem its impact on other modems. The reference line should represent the typical victim in a binder. In this context a victim of a line A is considered the line, which has most performance degradation due to the crosstalk of this line A. The reference line is used as an opponent line in a two-line optimization scheme performed for each line separately and is classified by its PSD, the crosstalk gain assumed from user n to the reference line and a background noise. ASB is further characterized by the definition of a static, pre-definition (i.e. before the optimization is done) reference line, which is used unchanged and being the same for all lines to be optimized.

Based on that, the following drawbacks follow:

The ASB method demands that each modem must know the reference line parameters before all—in other words, the network needs an initial configuration.

The definition of the reference line is static and does not take into account the dynamic nature of a network, i.e. system changes such as new line or lines going out of the system are not covered.

The utilization and performance of the reference line method is based on the assumption of its most advantageous definition. It is usually unknown in advance what this definition should really be.

Rather complete channel knowledge is necessary to even start further consideration of how a "typical" victim could look like. In reality, this channel knowledge can, in some situations, be imprecise or not available at all.

A reference line is not individually defined for each physical line, i.e. it is defined the same for all lines. This must at least prevent optimality and is probably impossible for large networks due to the spread of relations and channel and system properties.

Due to the fact that there is only one reference line definition and that this must be defined in advance, any change of the system affects all lines at the same time by a re-initialization of the reference line.

SUMMARY

The algorithms of prior art except sub-optimal IWF assume in general perfect and full channel knowledge, which usually is not available in practice. Also, good performance also often implies a higher complexity. Therefore, the object of the present invention is to achieve a near-optimal low-complexity scheme that depends the least possible on channel knowledge.

The object of the present invention is achieved by the introduction of a so-called ghost line. The ghost line is a fictitious line and reflects the impact of transmission of a particular line to the remaining ones. The central agent is responsible for adjusting the ghost line parameters according to the present network state. The central agent is able to adjust the ghost line parameters through message-passing steps between the transmitting modems and the central agent.

According to a first aspect of the present invention, a method for reducing crosstalk on a first line of a DSL network, wherein a ghost line being a substitution of the lines of the DSL network excluding the first line is introduced. The method comprises the steps of receiving from a first modem of the first line and at least from a second modem of a second line a respective measure (CDR) indicating the impact of crosstalk, calculating based on the received measure (CDR) indicating the impact of crosstalk a decision variable ($\Phi$) for the first modem and ghost line parameters for the first modem based on the decision variable ($\Phi$) for the first modem, and transmitting the calculated ghost line parameters (G) to the modem of the first line such that the first modem can update the power to be allocated to the first line based on the transmitted ghost line parameters.

According to a second aspect of the present invention a method for a modem of a first line of the DSL network is provided whereby a ghost line being a substitution of the lines of the DSL network excluding the first line is introduced and an initial ghost line is determined. The method comprises the steps of allocating an initial power to the first line that is optimized against the ghost line, transmitting to a central agent of the DSL network a measure indicating the impact of crosstalk. As a response updated ghost parameters are received, whereby the updated ghost line parameters are at least determined based on the measure indicating the impact of crosstalk. Then the power to be allocated to the first line can be updated based on the received updated ghost line parameters.

According to a third aspect a central unit for reducing crosstalk on a first line of the DSL network is provided, wherein a ghost line being a substitution of the lines of the DSL network excluding the first line is introduced. The central unit comprises a receiver for receiving from a first modem of the first line and at least from a second modem of a second line a respective measure (CDR) indicating the impact of crosstalk, a calculator for calculating based on the received measure (CDR) indicating the impact of crosstalk a decision variable ($\Phi$) for the first modem and ghost line parameters for the first modem based on the decision variable ($\Phi$) for the first modem, and a reporter for transmitting the calculated ghost line parameters to the modem of the first line such that the first modem can update the power to be allocated to the first line based on the transmitted ghost line parameters.

According to a fourth aspect a modem of a first line of the DSL network is provided, whereby a ghost line being a substitution of the lines of the DSL network excluding the first line is introduced and an initial ghost line is determined. The modem is configured to allocate an initial power to the first line that is optimized against the ghost line. The modem comprises a transmitter for transmitting to a central agent of the DSL network a measure (CDR) indicating the impact of crosstalk, a receiver for receiving updated ghost line parameters as a response, whereby the updated ghost line parameters are at least determined based on the measure indicating the impact of crosstalk, and a PSD calculator for updating the power to be allocated to the first line based on the received updated ghost line parameters.

An advantage with the present invention is that it presents a method to increase transmission performance in discrete-multi-tone based transmission systems. It allows finding a solution for the crosstalk problem associated with DSL transmission which implies that it finds transmit PSDs for every user and tone in the network so that data rates are maximized or power minimized on a system level. The method is trustable and stable.

Numerical experiments show that the proposed method achieves near-optimal performance with surprisingly low complexity and very limited demands on a-priori channel knowledge, especially when compared to existing solutions.

DETAILED DESCRIPTION

In this description, the rate maximization problem is focused on, but the proposed method and arrangements are also applicable to the power minimization problem.

The basic idea of the present invention is to provide the users (i.e. the lines) in the network with a ghost line, i.e. a virtual line that should reflect the damage to be caused to the remaining users in the network, and that each user allocates the PSDs such that the allocated PSD is optimized against this ghost line, either according to the RMP or according to the PMP. The difference between the ghost line and the reference line of ASB is that the ghost line is not static. A central agent is adapted to continuously and individually update the ghost lines by collecting a measure indicating the impact of crosstalk from all modems. The measure indicating the impact of crosstalk comprises preferably information about in which frequencies the modems suffer from crosstalk and to which extend. This measure is sent from modems and collected by a central agent referred to as a Spectrum Management Centre (SMC). When the central agent has received updated measures indicating the impact of crosstalk from the modems it is then able to calculate updated ghost line parameters, which, by further iteration, should reflect the current crosstalk situation between each modem and the remaining modems. The central agent subsequently transmits the updated ghost line parameters G to all modems. Each modem may then allocate PSDs such that its allocated PSD is optimized with respect to the updated ghost line. This procedure is preferably repeated for each modem. As said above this per-line optimization step is individually performed on each line and may have as target of maximizing the rate or minimizing the power.

In this way, the dynamic nature of DSL channels is considered and the network adjusts itself independently of initial conditions to a more profitable and intelligent state, in which each modem is both aware of its rate or power requirements and also its impact on other lines.

Figure 2:
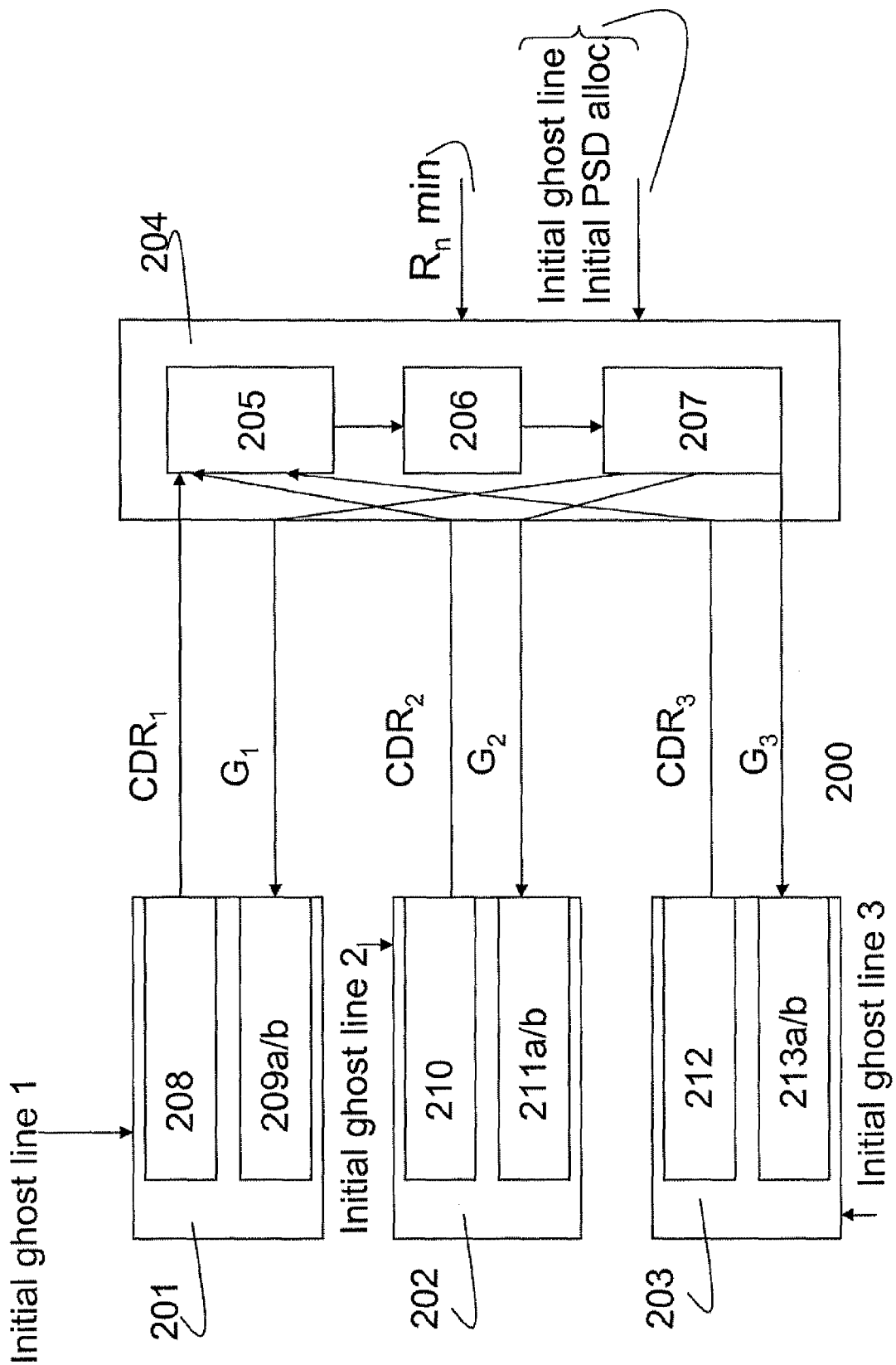
FIG. 2 illustrates an embodiment of the present invention.

Thus, the present invention relates to a method and arrangements for reducing crosstalk on a first modem 201 in a DSL network. Turning now to FIG. 2, where an exemplarily embodiment of the present invention is shown. The present invention relates to a central agent 204 and modems 201-203 of a DSL network 200. The central agent is preferably located in the central office. The central agent 204 is provided with a minimum rate Rn min and/or a maximum power Pn_max requirement. In accordance with the invention a ghost line to a first line is introduced wherein the ghost line is supposed to act as a substitution of the lines of the DSL network excluding the first line. Ghost lines of all modems are determined for each line individually and provided to each corresponding individual line. Hence, the ghost line of the first line is not presented to other lines.

An initial PSD allocation which is an optimization with respect to an initial ghost line is determined at each modem 201-203 by the PSD calculator 209b, 211b, 213b. The initial ghost line may be a fixed setting or suggested by the central office. Each modem 201-203 transmits by means of a crosstalk reporter 208, 210, 212 to the central agent 204 a respective measure $CDR_1$, $CDR_2$, $CDR_3$; indicating the impact of crosstalk for each relevant modem, i.e. the first modem 201 and the neighbouring modems 202, 203 of the first modem. The measure may be the parameter CDR (Crosstalk damage ratio) and additionally the parameter $w_n$, as explained below. The measure may be any parameter that gives information about the crosstalk impact, and the additional parameter may be any parameter that gives information about how much (fractional) channel resources must be shared with the ghost line to achieve the minimum requirements. The central agent 204 then receives the measure at a receiver 205 and determines at the ghost line calculator 206 updated ghost line parameters as a function of the reported information.

The updated ghost line parameter Gi comprising the updated coupling are reported to the first modem 201 received at the receiver 209a (211b and 213b denotes receiving means at the modems 202 and 203, respectively) by the reporter 207 of the central agent. It should be noted that the only ghost line parameter that is changed is the crosstalk gain $h_{n,G}^k$. Based on the report the first modem 201 is arranged to allocate the PSD by the PSD calculator 209. It should be noted that the updated ghost line parameters are calculated for each tone for the first modem 201, and the procedure described above for the first modem should be repeated for the remaining modems 202, 203 in the DSL network.

A further embodiment of the present invention is explained in the sequence and the text below:

A minimum required rate $R_k^{min}$ is determined for each modem n.

Input is a minimum rate requirement. INPUT: $R_n^{min} \forall n \geq 1$

The output should be the set of optimized PSDs one for each line which is denoted P

OUTPUT: P

1. Set $p_{n,G}^k$ and $h_{n,G}^k$ to flat levels $\forall n$.
2. REPEAT
3.    FOR n = 1, ..., N
4.       PSD allocation: each line determines and applies an optimized PSD against the ghost line);
5.       central agent: Receive $CDR_n^k = \left(1 - \frac{b_{n,xt+bg}^k}{b_{n,bg}^k}\right)$ and $w_n$ (see equation (2) and (2b)) $\forall n, k$;
6.       central agent: Processing
7.       $L_{sup}^k = \max_n (w_n | w_n > 0 \,\&\, w_n < 1)$
8.       $L_{inf}^k = \min_n (w_n | w_n > 0 \,\&\, w_n < 1), n > 1$
9.       FOR n = 1, ..., N
10.         FOR k = 1, ..., K
11.           $\Phi_n^k = \max_j [I_{n,j} w_j CDR_j^k], j \neq n$;
12.           IF $\Phi_n^k > L_{sup}^k$
13.             $h_{n,G}^k = \alpha h_{n,G}^k$;
14.           else
15.             $h_{n,G}^k = h_{n,G}^k / \alpha$;
16.    central agent: Send $h_{n,G}^k \forall n, k$
17. UNTIL convergence.

1. Initially, an initial ghost line PSD $p_{n,G}^k$ and an initial crosstalk gain $h_{n,G}^k$ between a line and its assigned ghost line are set to predetermined levels for all n, i.e. for all modems.

These are the values that will influence the PSD allocation for all users (see 4.) in the first iteration. The PSD allocation is done in an optimization procedure against the ghost line: each user should attempt to achieve its target, i.e. a minimum or maximum rate for a given PSD or power limit, while doing the least damage possible to the transmission of the ghost line. Known methods like the dual decomposition approach disclosed in R. Cendrillon, W. Yu, M. Moonen, J. Verlinden, and T. Bostoen, "Optimal Multi-user Spectrum Management for Digital Subscriber Lines," in Proc. IEEE International Conference ona Communications (ICC), Paris, 2004, pp. 1-5. are applicable but not exclusive.

The initial flat values of $p_{n,G}^k$ (reference PSD) and $h_{n,G}^k$ (crosstalk gain between line and its ghost line) do not represent real channel conditions and will be adjusted during the execution of the method. $\sigma_{n,G}^k$ is the reference background noise. Bit loading for the ghost line may be calculated as $$b_{n,G}^k = \log_2\left(1 + \frac{P_{n,G}^k}{\sigma_{n,G}^k + h_{n,G}^k p_n^k}\right).$$

Calculation of bit loading is a straight forward and already practiced procedure [see all DMT-based DSL standards].

2. and 3. The following procedure is repeated for each $1 \leq n \leq N$, i.e. for all N modems, until the PSD allocations converge, i.e. do not change considerably anymore.

4. Determine the PSD allocation against the current ghost line. If no crosstalk information is yet received from the modems, the initial ghost line is used. The PSD allocation can be done by using either the RPM or the PMP strategy. Independent of that, the ghost line should be able to achieve the highest possible rate. The reason behind that is that this ensures the least crosstalk to the rest of the network in all cases.

Figure 3:
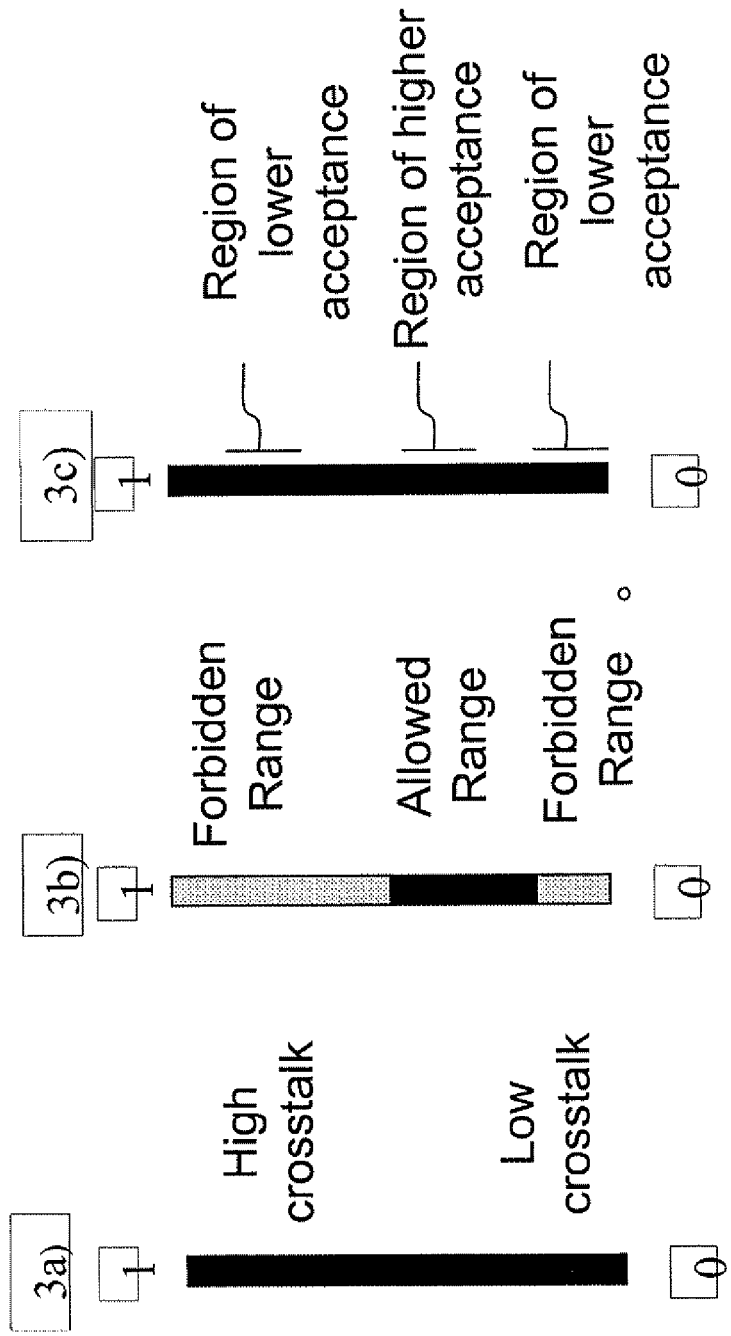
FIG. 3 illustrates the crosstalk damage ratio that is used in an embodiment of the present invention.

5. Each modem should have at its disposal a fixed estimation of its background noise, which today's modem hardware easily can measure. These values will be necessary for calculation of the following relation $$CDR_n^k = 1 - \frac{b_{n,xt+bg}^k}{b_{n,bg}^k},$$

which hereafter will be referred to as Crosstalk Damage Ratio (CDR) of user n on tone k. The CDR can be interpreted as the amount of crosstalk disturbance user n experiences: $b_{n,xt+bg}^k$ is bit loading when noise is crosstalk plus background noise and $b_{n,bg}^k$ is bit loading when there would be only background noise. Since the possible bit loading considering crosstalk is always lower with crosstalk than without, $0 \leq b_{n,xt+bg}^k \leq b_{n,bg}^k$. As a consequence $CDR_n^k \in [0,1]$. There are two extreme cases, i.e. when CDR=0 and CDR=1. When CDR=0, crosstalk has no impact on the achievable bit load and is therefore low (at least compared to the background noise). When CDR=1, there is a lot crosstalk impact, up to the point, where information transmission is not possible anymore. As said, all other cases lie in between. This is also indicated in FIG. 3a and is the reason why CDR can be used as a crosstalk representing quality measure. From experience in numerical simulations, it is known that every good DSM solution should have the crosstalk damage ratio as low as possible. With the sequence of iteration the central agent will suggest new values for ghost line parameters so that rather low CDR values are provided.

According to this embodiment the modems can also report to the central agent a value that gives information about the amount of channel resources necessary to be used compared to the ghost line. The value $w_n$, as defined in conjunction with equation (2) or (2b) can be used, but other qualities such as waterlevel-based qualities in water filling based approaches are suitable too. This value, which also ranges from 0 to 1, can be interpreted as the amount of priority user n needs to fulfil its rate requirements in the competing optimization with the ghost line.

Figure 1:
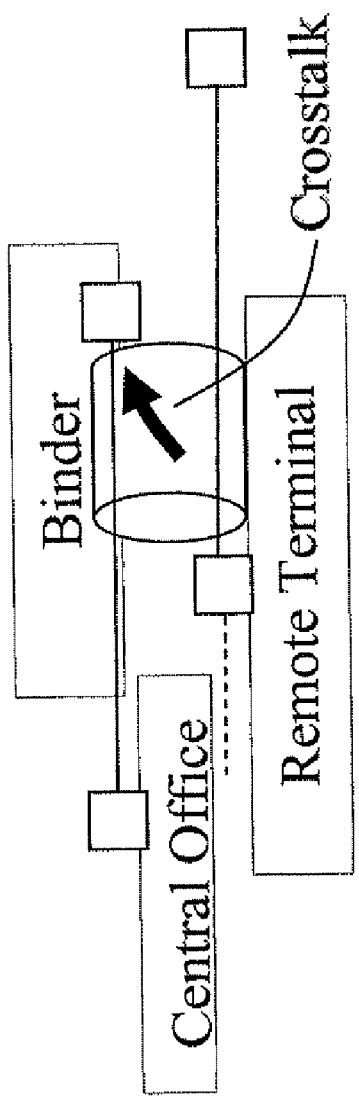
FIG. 1 illustrates crosstalk originated in the remote terminal that affects the transmission of the central office.

To illustrate what a demanding line is, consider the scenario on FIG. 1. Such a scenario has a rate region such as that in FIG. 4. The dotted line denotes a case when there is no crosstalk among users. The full line denotes a hypothetical rate region for such a scenario, in which the increase in the data rate of one user often implies the decrease of rate on the other user. The points in which the full line touches the $R_{RT}$ and $R_{CO}$ axis imply that only one user is transmitting, i.e., these points represent single-user points, in which the network is utilized by only one of the users (in the figure the points $(R_{RT}^{max},0)$ and $(0,R_{CO}^{max})$). The same relationship is true for a line and its ghost line. The points $(R_{line}^{max},0)$ and $(0,R_{Ghostline}^{max})$ go along with w=1 and w=0, all other points will correspond to a unique w∈(0,1) in the solution of for example equation 2. Therefore, a direct relation between a certain minimum rate requirement and w can be established and from the weight or priority, the demanding target can be determined based on the argument of w. Accordingly, the distance of a working point to either of these points can be interpreted as an indicator of how much emphasis during the optimization must be put on the corresponding line.

Figure 4:
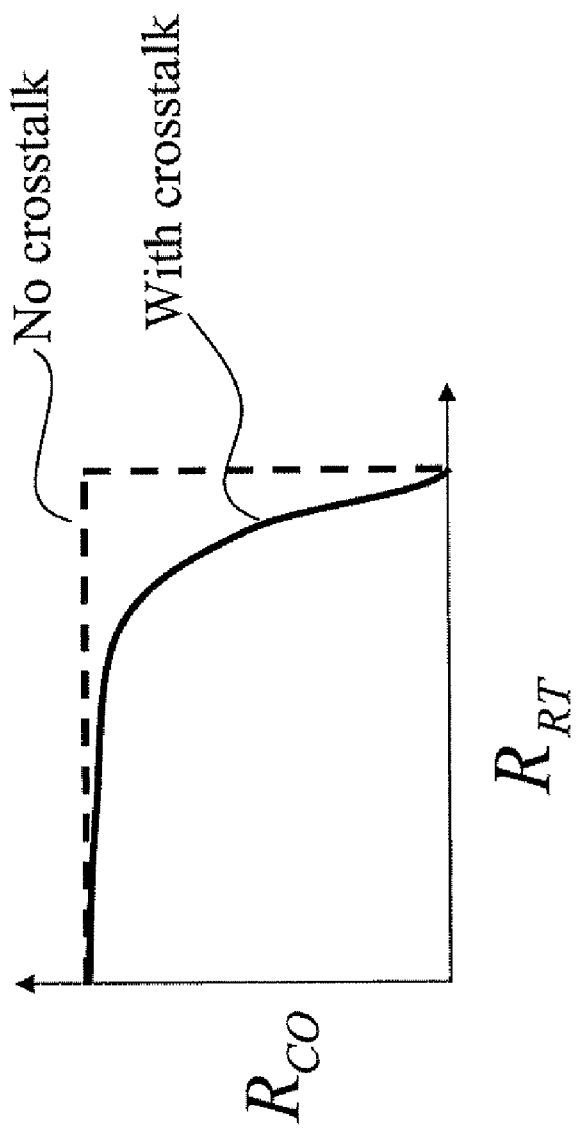
FIG. 4 is graph showing the rate region for the scenario illustrated in FIG. 1.

After all $w_n$'s have been sent (only one $w_n$ per modem), the central agent will choose the limits of the allowed crosstalk range shown in FIG. 3b. The maximum value of $w_n$, n>1, may be generally set to a function of $L_{sup}$ and the minimum value can be set to a function of $L_{inf}$ as well. Fixed limits are also possible if no reliable information of the type of w is available. The choice of limits for was indicated in conjunction with FIG. 4 is reasonable: if one user (i.e. modem) sends a large $w_n$, it means that it has demanding requirements, which in turn means that this user is allowed to emit more crosstalk to other users and vice versa.

6.-8. The central agent attributes allowed and forbidden zones in the CDR line for each particular scenario as shown in FIG. 3a. As depicted in FIG. 3b, this division is according to this embodiment characterized by a superior and an inferior value on the allowed area, $L_{sup}$ and $L_{inf}$ respectively. It should be noted that only a superior limit may be used. This decision on allowed and forbidden areas can also be smooth in terms of a weighted area of acceptance, see FIG. 3c, as opposed to the "hard" decision as indicated in FIG. 3b. For example, as stated above it is possible to make the limits $L_{sup}$ or $L_{inf}$ soft, i.e. a factor or weight is introduced reflecting the degree of acceptable conditions, as indicated in FIG. 3c, in which the tones indicating the different areas would gently turn into a darker or lighter tone. This factor is used to put a weight on the resulting changes, leading either to further increased or decreased changes. The alternative of hard decisions as shown in FIG. 3b is considered below. As said and in accordance with this embodiment, the limits $L_{sup}$ and $L_{inf}$ respectively may be functions of $w_n$. The allowed range may also be a function of the CDR.

9.-11. After the choice of the allowed area, the method now proceeds to adjustments of the ghost line parameter. The only ghost line parameter that is changed is the crosstalk gain $h_{g,n}^k$. Therefore, a decision variable $\Phi_n^k$ is calculated for every user and tone as a function of the reported CDRs. It should be noted that the decision variable may also be calculated as a function of the reported qualities $w_n$ in addition to the reported CDRs as in line 11 in Table 3. A linear combination of $w_n$ and the CDRs is suitable as found by simulations, but a non-linear dependency can be applied, too. In any case, emphasis should be given to the most damaged victim. It is reasonable to consider that, since if the most damaged victim is protected, then all other users are also protected. The calculation of $\Phi_n^k$ involves an additional weight matrix I, which has the form of $$I = \begin{bmatrix} i_{1,1} & \cdots & i_{1,N} \\ \vdots & \ddots & \vdots \\ i_{N,1} & \cdots & i_{N,N} \end{bmatrix},$$

in which each element is either 0 or 1 (i.e., $i_{n,j} \in \{0,1\}$). ($i_{3,1}$ is the disturbance of the third transmitter to the first receiver). If $i_{n,j}=0$ implies that user n does not interfere with user j. If $i_{n,j}=1$ then it is assumed that there is reasonable interference. This is in principle the only necessary crosstalk channel information, which implies that frequent channel measurements can be avoided. The I matrix can be derived by primitive inspection of network topology, since either there is considerable crosstalk between two specific lines assumed or not. A further refinement of the interference indicating matrix I by allowing values in between 0 and 1, assuming different levels of channel knowledge, is possible to further improve the quality of the results.

12.-15. The method then proceeds to the adjustment of the ghost line parameter $h_{n,G}^k$. Three situations are possible: 1) if the decision variable D is inside an allowed area then the crosstalk user n causes to other users is within a desired margin and no changes need to be done; 2) if $\Phi_n^k$ is greater than a $L_{sup}$, then user n causes too excessive crosstalk to others on this particular tone, which means that $h_{n,G}^k$ should be increased. This will result in a reduced interference emission after the next iteration, since user n will be more careful in allocating power on this tone to allow the ghost line achieving a maximum rate (see also the description in step 4.); and 3) if $\Phi_n^k$ is smaller than a $L_{inf}$ then user n causes no significant crosstalk for other users on this tone and $h_{n,G}^k$ can be decreased. Thus, on the next iteration user n will have more freedom to allocate power on this tone. The way how $h_{n,G}^k$ is increased/decreased just affects the speed of convergence and can be done by fixed or dynamical in-/decrements or by a simple multiplication (or division) with a factor α.

16. After adjustment of the ghost line crosstalk gains for each line, the central agent can now provide modems with the new parameters. The modems can now allocate PSD again and send the CDR's and $w_n$'s back to the central agent.

Figure 5:
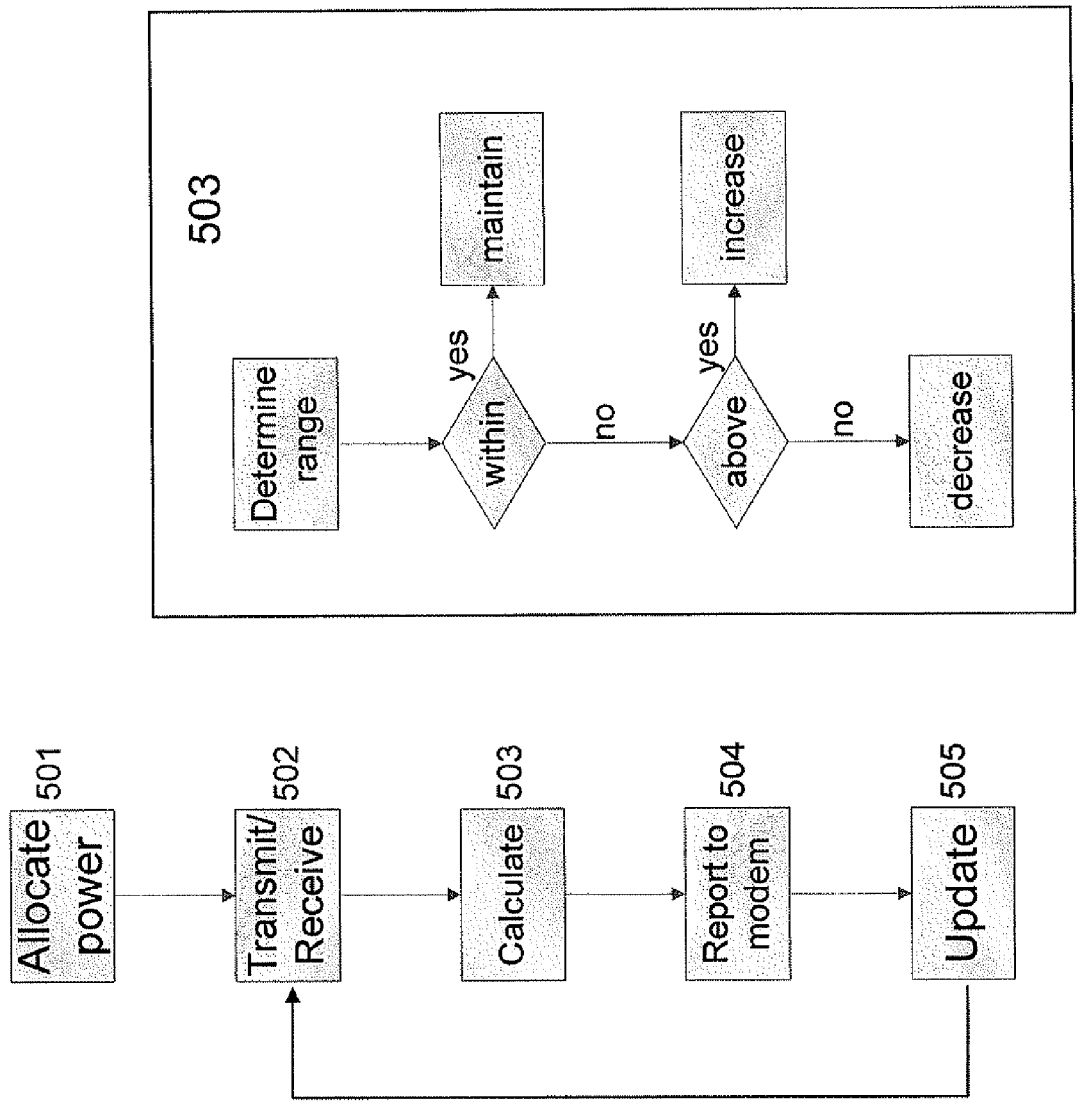
FIG. 5 is a block diagram showing the method according to an embodiment of the present invention.

The method according to the invention is illustrated in the flowchart of FIG. 5.

501 Allocate at the modems an initial power to the lines that are optimized against a respective initial ghost line.

502. Transmit from the modems to the central agent of the DSL network a measure (CDR) indicating the impact of crosstalk.

503. Calculate based on the received measure (CDR) indicating the impact of crosstalk a decision variable (1) for the first modem and ghost line parameters for the first modem based on the decision variable (4)) for the first modem.

504. Report the calculated ghost line parameters (G) to the modem of the first line.

505. Update the power to be allocated to the first line based on the received updated ghost line parameters (G and continue with step 502.

According to an embodiment of the invention, step 503 comprises the further steps:

506. Determine an allowed crosstalk range (Lsup, Linf) for the decision variable Φ as a function of the measure (CDR or CDR and w).

507. Maintain previously determined ghost line parameters when the estimated crosstalk-representing level is within the allowed crosstalk range.
508. Increase a coupling between the ghost line and the first line when the decision variable $\Phi$ is above the allowed crosstalk range.
509. Decrease a coupling between the ghost line and the first line when the decision variable $\Phi$ is below the allowed crosstalk range.

Figure 6:
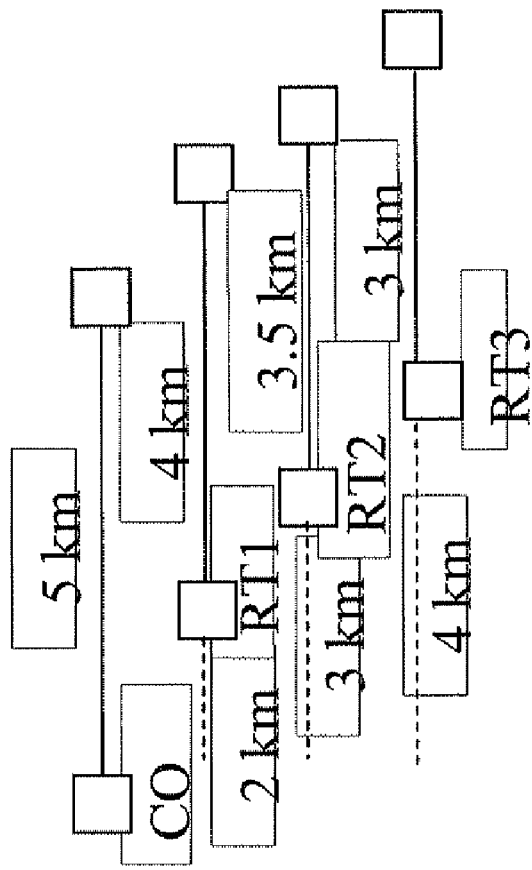
FIG. 6 illustrates the scenario that was simulated in order to compare the method of the present invention with methods of prior art.
Figure 7:
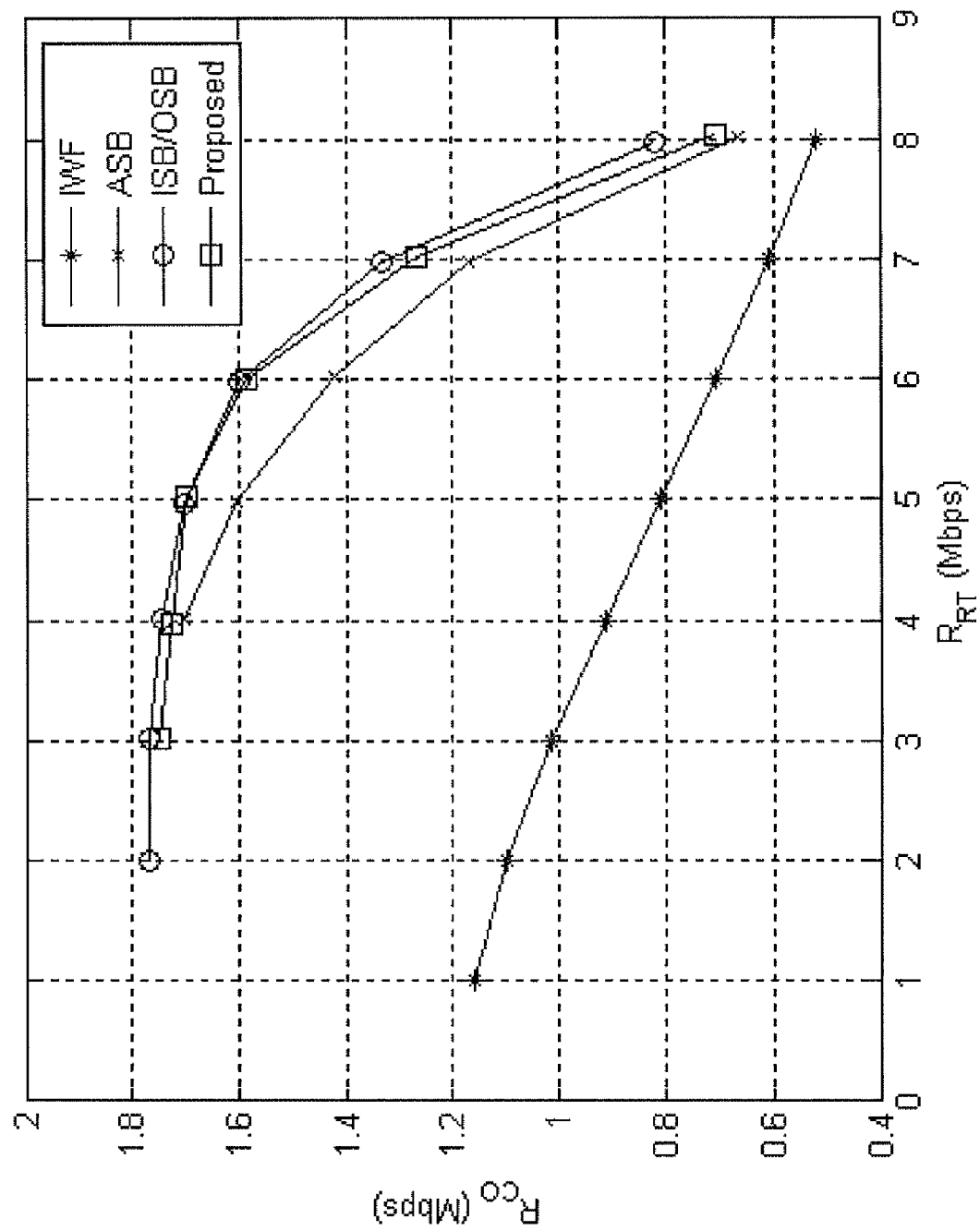
FIG. 7 illustrates the rate regions of the simulations of the scenario of FIG. 6.

To compare the performance of the proposed method with other solutions the scenario in FIG. 6 was simulated. A Central Office (CO) and three Remote Terminals (RT) transmitting in downstream ADSL are involved in the scenario. Due to this near-far scenario, the CO-downstream transmission is subject to heavy levels of crosstalk and should be protected. Minimum rates for $RT_1$ and $RT_2$ were set to 2 and 2.25 Mbps respectively, while the minimum rate of $RT_3$ ranged from 3 to 8 Mbps in each simulation. For each situation, it was observed how many Mbps are possible to provide to the CO user with BER of $10^{-7}$ and noise margin of 12 dB. Three different optimization methods have their rate regions as depicted in FIG. 7. ISB, the iterative version of OSB which is an optimal but fully centralized solution, performs better however with increased demands on complexity and channel knowledge. For ASB the reference line was set to the crosstalk characteristics between a line and the CO operated line (the upper one in FIG. 6) in contrast to the present invention where each line has a ghost line, which serves as an individual reference. It is seen that among the three methods, ASB is the one with worst performance, i.e. it results in the most restricted rate region. The most outer line is said to be optimal and as such accepted in the community. ISB is the most inner line and BLIND is the middle line. In simple word, performance of a working point is better the nearer it is to the most outer line.

It is worth to emphasize that both these method, ISB and ASB, assume perfect channel knowledge.

The proposed method performs almost as good as the optimal one (OSB/ISB, which is generally accepted to be optimal) but with considerably less complexity and channel knowledge. It is seen that the proposed solution achieves the best trade off among the most important aspects for a practical DSM solution in terms of performance, complexity, centralization and required system knowledge.

Further, the method according to the present invention is applicable for the general class of multi-carrier transmission systems.

The invention claimed is:

1. A method for reducing crosstalk on a first line of a Digital Subscriber Line (DSL) network, the method comprising the steps of:
    introducing a ghost line into the network, the ghost line being a substitution of the lines of the DSL network excluding the first line;
    receiving by a central agent, a measurement sent by a modem of the first line indicating the impact of crosstalk on the first line due to the ghost line;
    calculating by the central agent, updated ghost line parameters for the first line based on the received measurement and on other measurements received from other lines in the network for which ghost lines were introduced; and
    transmitting the calculated updated ghost line parameters to the modem of the first line such that the first modem can update power to be allocated to the first line based on the transmitted updated ghost line parameters.

2. The method according to claim 1, wherein the measurement indicating the impact of crosstalk is received from a respective modem of each line of the DSL network.

3. The method according to claim 1, wherein the measurement indicating the impact of crosstalk includes information about frequencies at which the modem suffers from crosstalk.

4. The method according to claim 3, wherein the measurement also indicates a fraction of channel resources that must be allocated to achieve a given minimum rate.

5. The method according to claim 1, wherein the step of calculating updated ghost line parameters for the first modem includes determining an allowed crosstalk range as a decision variable.

6. The method according to claim 5, wherein an extent of the allowed crosstalk range depends on a value of the measurement.

7. The method according to claim 5, wherein the step of calculating updated ghost line parameters includes maintaining previously determined ghost line parameters when the decision variable is within the allowed crosstalk range.

8. The method according to claim 5, wherein the step of calculating updated ghost line parameters includes increasing a coupling between the ghost line and the first line when the decision variable is above the allowed crosstalk range.

9. The method according to claim 5, wherein the step of calculating updated ghost line parameters includes decreasing a coupling between the ghost line and the first line when the decision variable is below the allowed crosstalk range.

10. The method according to claim 5, further comprising:
    introducing in the DSL network, a weighting matrix indicating the interference between the lines of the network;
    wherein the step of determining an allowed crosstalk range as a decision variable includes calculating the decision variable based on the interference matrix.

11. A method performed in a modem of a first line of a Digital Subscriber Line (DSL) network in which an initial virtual ghost line having initial parameters is introduced as a substitution of the lines of the DSL network excluding the first line, the method comprising the steps of:
    allocating an initial power to the first line that is optimized against the ghost line;
    transmitting to a central agent of the DSL network a measurement indicating the impact of crosstalk on the first line due to the initial ghost line;
    receiving updated ghost line parameters from the central agent as a response, wherein the updated ghost line parameters are at least determined based on the measurement indicating the impact of crosstalk; and
    updating the power to be allocated to the first line based on the received updated ghost line parameters.

12. The method according to claim 11, wherein the step of transmitting a measurement includes transmitting a measurement that includes information about frequencies at which the modem suffers from crosstalk and the fraction of channel resources that must be allocated to achieve a given minimum rate.

13. A central unit for reducing crosstalk on a first line of a Digital Subscriber Line (DSL) network having a plurality of lines, wherein for each given line of the DSL network, an associated virtual ghost line substituting for the remaining lines of the DSL network excluding the given line is introduced, wherein the central unit comprises:
    a receiver for receiving from modems of each of the plurality of lines, respective measurements indicating the impact of crosstalk on each line due to the line's associated ghost line;
    a calculator for calculating based on the received measurements, a decision variable for each modem and updated ghost line parameters for each modem based on each modem's decision variable; and a reporter for transmitting the calculated updated ghost line parameters to each modem such that each modem in the DSL network can update the power to be allocated to each line based on the transmitted ghost line parameters.

14. The central unit according to claim 13, wherein the measurement indicating the impact of crosstalk includes information about frequencies at which the modem suffers from crosstalk and the fraction of channel resources that must be allocated to achieve a given minimum rate.

15. The central unit according to claim 13, wherein the calculator for calculating updated ghost line parameters includes means for determining as a decision variable, an allowed crosstalk range depending on a value of the measurement.

16. The central unit according to claim 15, wherein the calculator includes means for maintaining previously determined ghost line parameters when the decision variable is within the allowed crosstalk range.

17. The central unit according to claim 15, wherein the calculator includes:
   means for increasing a coupling between a given ghost line and the given ghost line's associated line when the decision variable is above the allowed crosstalk range; and
   means for decreasing a coupling between a given ghost line and the given ghost line's associated line when the decision variable is below the allowed crosstalk range.

18. The central unit according to claim 13, wherein a weighting matrix indicating the interference between the lines of the DSL network is introduced, and the calculator includes means for calculating the decision variable also based on the interference matrix.

19. A modem of a first line of a Digital Subscriber Line (DSL) network in which a virtual ghost line substituting for the remaining lines of the DSL network excluding the first line is introduced and an initial ghost line is determined, the modem comprising:
   means for allocating an initial power to the first line that is optimized against the ghost line;
   a transmitter for transmitting to a central agent of the DSL network, a measurement indicating the impact of crosstalk on the first line due to the ghost line;
   a receiver for receiving updated ghost line parameters from the central agent as a response, wherein the updated ghost line parameters are at least determined based on the measurement indicating the impact of crosstalk; and
   a Power Spectral Density (PSD) calculator for updating the power to be allocated to the first line based on the received updated ghost line parameters.

20. The modem according to claim 19, wherein the measurement includes information about frequencies at which the modem suffers from crosstalk and the fraction of channel resources that must be allocated to achieve a given minimum rate.

* * * * *

UNITED STATES PATENT AND TRADEMARK OFFICE
CERTIFICATE OF CORRECTION

PATENT NO. : 8,295,151 B2
APPLICATION NO. : 12/531558
DATED : October 23, 2012
INVENTOR(S) : Dortschy et al.

It is certified that error appears in the above-identified patent and that said Letters Patent is hereby corrected as shown below:

In Column 1, Line 51, delete "$p_n^k$," and insert -- $p_n^k$ --, therefor.

In Column 1, Line 67, delete "... $p_{N-1}^k$," and insert -- ..., $p_{N-1}^k$, --, therefor.

In Column 3, Line 36, delete "Spectum" and insert -- Spectrum --, therefor.

In Column 3, Line 48, delete "J. Papandrlopoulos" and insert -- J. Papandriopoulos --, therefor.

In Column 3, Line 55, delete "R. Cenchillon," and insert -- R. Cendrillon, --, therefor.

In Column 3, Line 58, delete "Infounation" and insert -- Information --, therefor.

In Column 6, Line 67, delete "$w_n$," and insert -- $w_n$ --, therefor.

In Column 7, Line 25, delete "$R_k^{min}$," and insert -- $R_n^{min}$ --, therefor.

In Column 8, Line 2, delete "ona" and insert -- on --, therefor.

In Column 10, Line 55, delete "(1)" and insert -- ($\Phi$) --, therefor.

In Column 10, Line 57, delete "(4))" and insert -- ($\Phi$) --, therefor.

Signed and Sealed this
Twenty-sixth Day of February, 2013

Teresa Stanek Rea
*Acting Director of the United States Patent and Trademark Office*